United States Patent [19]

Noirel

[11] Patent Number: 4,496,975
[45] Date of Patent: Jan. 29, 1985

[54] ONE-WAY DATA TRANSMISSION SYSTEMS

[75] Inventor: Maurice Y. Noirel, Montfort, France

[73] Assignee: L'Etat Francais, Represente par Le Ministre des P.T.A. (Centre National D'Etudes des Telecommunications), Paris, France

[21] Appl. No.: 376,790

[22] Filed: May 10, 1982

[30] Foreign Application Priority Data

May 14, 1981 [FR] France ................................ 81 10089

[51] Int. Cl.³ .......................... H04N 1/32; H04J 3/16
[52] U.S. Cl. .................................... 358/147; 358/142; 370/82; 370/83
[58] Field of Search ..................... 358/142, 86, 11, 12, 358/84, 117, 140, 141; 370/82, 83, 79

[56] References Cited

U.S. PATENT DOCUMENTS 4,058,830 11/1977 Guinet et al. ......................... 358/86
4,317,132 2/1982 Guinet .................................. 358/142
4,420,833 12/1983 Noirel ................................. 358/142

Primary Examiner—Tommy P. Chin
Attorney, Agent, or Firm—Laff, Whitesel, Conte & Saret

[57] ABSTRACT

A one-way teletext data transmission system is an improvement over a known teletext system sold under the trademark "ANTIOPE" which transmits data having error correction and ciphering. The length of the transmitted data pack is always the maximum pack length and the value of the format byte is nil. A wire is connected from every channel to its individually associated coupler. That wire may be at either of the binary levels "1" or "0". The coupler comprises a first switch for switching between a counter and a memory. The memory stores a format byte, the value of which is nil. A second switch connects the memory to a data memory when any data packet transmission occurs, if the wire is at a predetermined binary level "1". The reception equipment is similar.

2 Claims, 6 Drawing Figures

TRANSCODING CIRCUIT

ONE-WAY DATA TRANSMISSION SYSTEMS

The present invention relates to one-way data transmission systems of the type described in the U.S. Pat. Nos. 4,058,830, 4,317,132 and U.S. patent application Ser. No. 189,080 (now U.S. Pat. No. 4,420,833).

In the one-way or broadcast data transmission systems described in the above mentioned patents, the transmitted data are arranged in packs (sometimes also called "packets"), each pack having, at most, the active duration of a television line. The packs are inserted either in place of the picture signals, or in the vertical blanking signal between the conventional line synchronism signals.

Each broadcasted pack begins with a prefix containing, in addition to the conventional bit and byte, synchronization signals and the channel identification code signals, a pack format signal which indicates the length of the sequence of data which follows the prefix. More specifically, in the pack, the useful data and the prefix data are grouped into bytes or octets. Therefore, the format signal is a byte which indicates the number of bytes of useful data which follows the prefix.

The tests carried out with the transmission system, according to the above defined system and using as a transmission channel a public broadcast network, have shown that it was necessary to protect the pack data against transmission errors. The same conclusion is valid for the informations contained in the prefix. As the data pack is formed of bytes, it proves especially simple to provide for a protection against errors and for an error correction, byte by byte. It is then normal to adopt a byte structure conforming to a Hamming code, that is to say a structure in which, for example, the bits b1, b3, b5 and b7 are reserved for the correction of errors, while the bits b2, b4, b6 and b8 carry the data.

In the above mentioned U.S. Pat. No. 4,420,833, a system makes it possible, through the use of a pre-determined convention, to use only a single format byte, in each pack prefix. The format byte comprises four information carrying bits and four bits for the correction of possible errors in transmission, for useful data packs comprising more than sixteen bytes and, especially, up to fifty-one useful bytes.

The invention provides a system for transmitting to more sophisticated receivers. In addition to the conventional teletext data, such as the ANTIOPE system data, the invention transmits data strings having such structures that they provide some possibilities of error correction and ciphering which, for instance, are defined in the draft of standard ISO 7498 regarding the architecture of the interconnection networks of open data transmission systems. Of course, the transmission of those specific data should be compatible with that of teletext data, i.e. transmission means must be kept compatible and the implementation of the new system must not result in substantial changes in the existing receivers.

According to the invention, a data one-way transmission system uses a transmitting station which transmits, in the form of packs, digital data, possibly delivered from several channels, each packet including a prefix containing, in addition to the conventional sync signals and channel identification code signal, a packet format signal normally indicating the length of the data sequence following the prefix. The transmission station has as many couplers as there are channels. Each coupler has an input circuit whose input is connected from the output of the channel associated with the concerned coupler and output is connected to a data memory whose output can be connected to a multiplexing circuit under control of a control circuit, common to all couplers, and a counter fed at a predetermined rate. An inhibition control signal is delivered to the input circuit as soon as either the data memory is full, or the counter has reached a predetermined count. Then, the data memory is connected to the multiplexing circuit, then read out, then the counter is reset, and the inhibition control signal is suppressed. A register having a settable maximum capacity delivers the inhibition control signal when the count of the data reaches a predetermined value, wherein, between the data memory and the input circuit, a small capacity buffer memory is provided. The read out of data from the buffer memory is controlled by a programmed circuit, wherein an additional wire is provided between each channel and the associated coupler. The additional wire is switchable to level "1" (or "0"). Each coupler further includes first switching means for switching off the counter and buffer memory. A format byte memory stores the value "nill" and a second switching means connects the format byte memory to the data memory, for each data pack transmission when the additional wire is at level "1" (or "0"). The first and second switching means are at rest when the additional wire is at level "0" (or "1").

According to another feature, a reception equipment receives a signal from the data one-way transmission system, wherein signals follow the prefix. Once this one has been accepted, the data are transmittted to a buffer memory whose output is connected to an output circuit. A format signal register stores the format signal of each received pack prefix and a counter is fed by the byte clock signal. The counter controlling the read out of the data sequence from the buffer memory into the output circuit. As soon as it has reached a predetermined maximum count, the length of the data sequence is limited by the contents of the format signal register that is fed from a transcoding circuit processing the transmitted format signal, wherein the transcoding circuit includes means for recognizing the value "nil" of a format byte. That value into the value is converted Nmax that is transmitted to the format signal register. An additional output wire is connected to the output circuit.

The above mentioned features of the present invention, as well as others, will appear more clearly from the following description of an embodiment, the said description being made in conjunction with the attached drawings, wherein.

Figure 1:
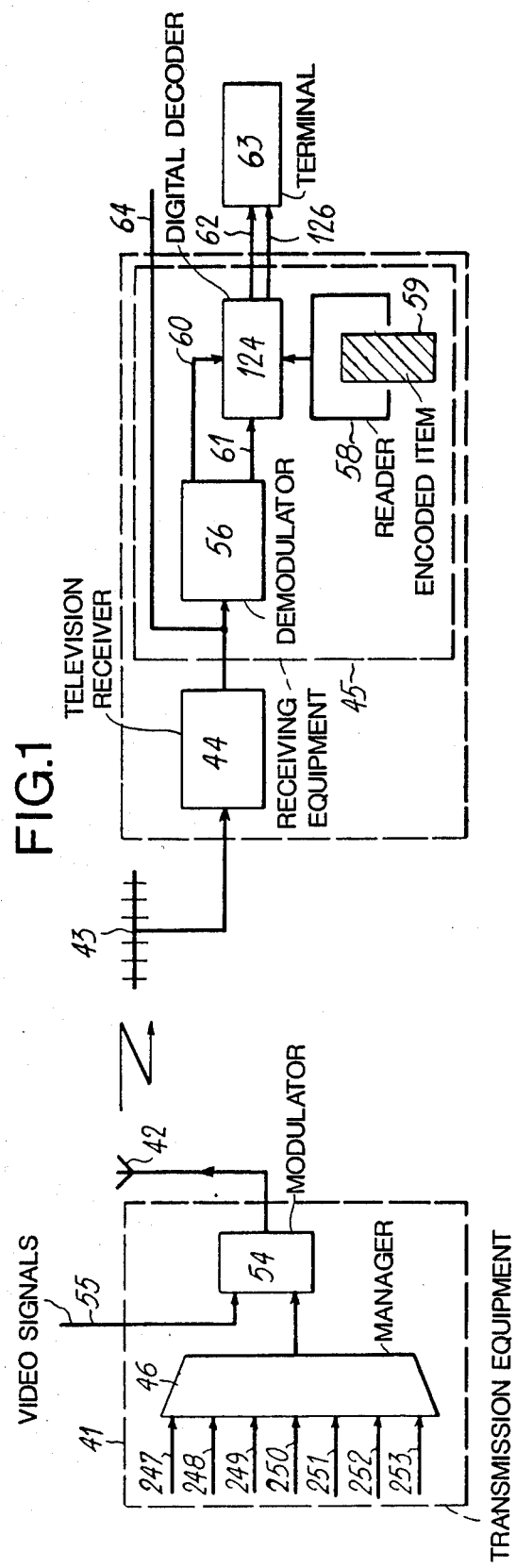
FIG. 1 is the block-diagram of a data broadcast system in which the improvements according to the present invention are incorporated.

The data diffusion system shown in FIG. 1 comprises a transmitting station which has a transmission equipment 41 and a telebroadcasting antenna 42, as well as a plurality of subscriber receiver sets having a reception antenna 43, a television receiver set 44 and a data receiving equipment 45.

The transmission equipment 41 comprises a unit 46 called the "manager", which is provided for time division multiplexing the data messages provided from a plurality of data sources which, in the described embodiment, is assumed to be limited to seven sources 247–253, which are sources able to transmit normal data as well as data permitting possibilities of error corrections of errors and ciphering. Equipment 41 further comprises a modulation part 54 which receives, on the one hand, the signals transmitted from the manager and, on the other hand, video signals through a link 55, and which transmits signals to a conventional transmitter device, not shown, which feeds antenna 42. By way of example, the description of a modulation part 54, which is not part of the present invention, is found in the above mentioned U.S. Pat. No. 4,058,830, and, especially, with respect to FIG. 4 thereof.

The data transmitted from the manager 46 are arranged in packs. In the modulation part 54, the packs are inserted in place of TV line signals between the conventional TV line sync signals.

Figure 2:
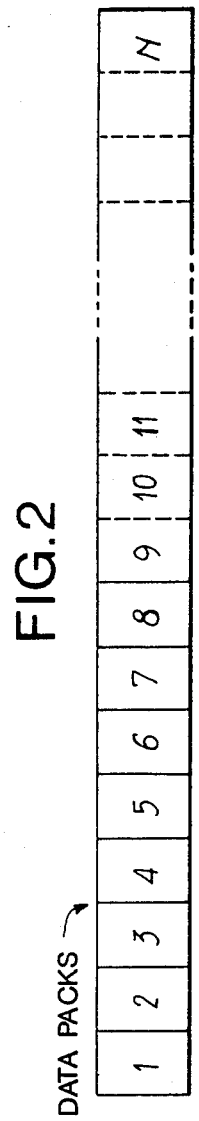
FIG. 2 is a diagram of data packs making it possible to illustrate the operation of the system shown in FIG. 1.

FIG. 2 shows an example of data packs transmitted by manager 46, then, after modulation, by antenna 42.

The pack has a length of N bytes numbered from 1 to N, and it is composed of two parts. The first part, called prefix, is prepared under control of manager 46 and it is constitued, in the shown example, by the first eight bytes 1–8. The second part, constituted by bytes 9–N, with $N-9=M$, constitutes the actual or useful data of the packet. The number N always remains inferior to a number Nmax which may vary, depending on the standard of the television network which ensures the broadcast. It may be determined by optimizing, taking into account the length of the useful television line and the pass band. Thus, in the French standard with 625 lines, Nmax may reach 40, this corresponding to the L standard recommended by the CCIR.

In the prefix, the bytes 1 and 2 are reserved for synchronization of the bits of the pack. They are each composed of the sequence of bits 10101010. The so-called "start" byte 3 conventionally makes it possible to perform the byte-by-byte sync and may correspond to the sequence 11100111. Bytes 4, 5 and 6 are reserved for the identification of the digital channel and are prepared in encoded form by the manager 46. The so-called "continuity" byte 7 makes it possible to count the numbers or indices of the packs from 1 to 15 and thus to take account of the lacks of packs or of errors in the receiving equipment. Finally, byte 8 indicates the "format" of the pack, that is to say the number of bytes M which follow the prefix to form the pack.

With reference again to FIG. 1, the television receiver 44 transmits from its video output the video signals of the equipment 45. The latter comprises a demodulating part 56, a digital part 124 and a reader 58 able to read an encoded item 59. The demodulating part 56 delivers to 124 a bit frequency signal through 60 and the last $(N-3)\times 8$ of the N bytes of the pack through 61. The information read by reader 58 are permanently applied to the digital part 124. With respect to the purpose of the encoded support 59, it will be useful to refer to the U.S. Pat. No. 4,058,830. The digital part 124 delivers from 62 the data bytes of the packs, through a suitable terminal, such as 63, plus a signal on a line 176 which will be described with respect to FIG. 5.

Figure 3:
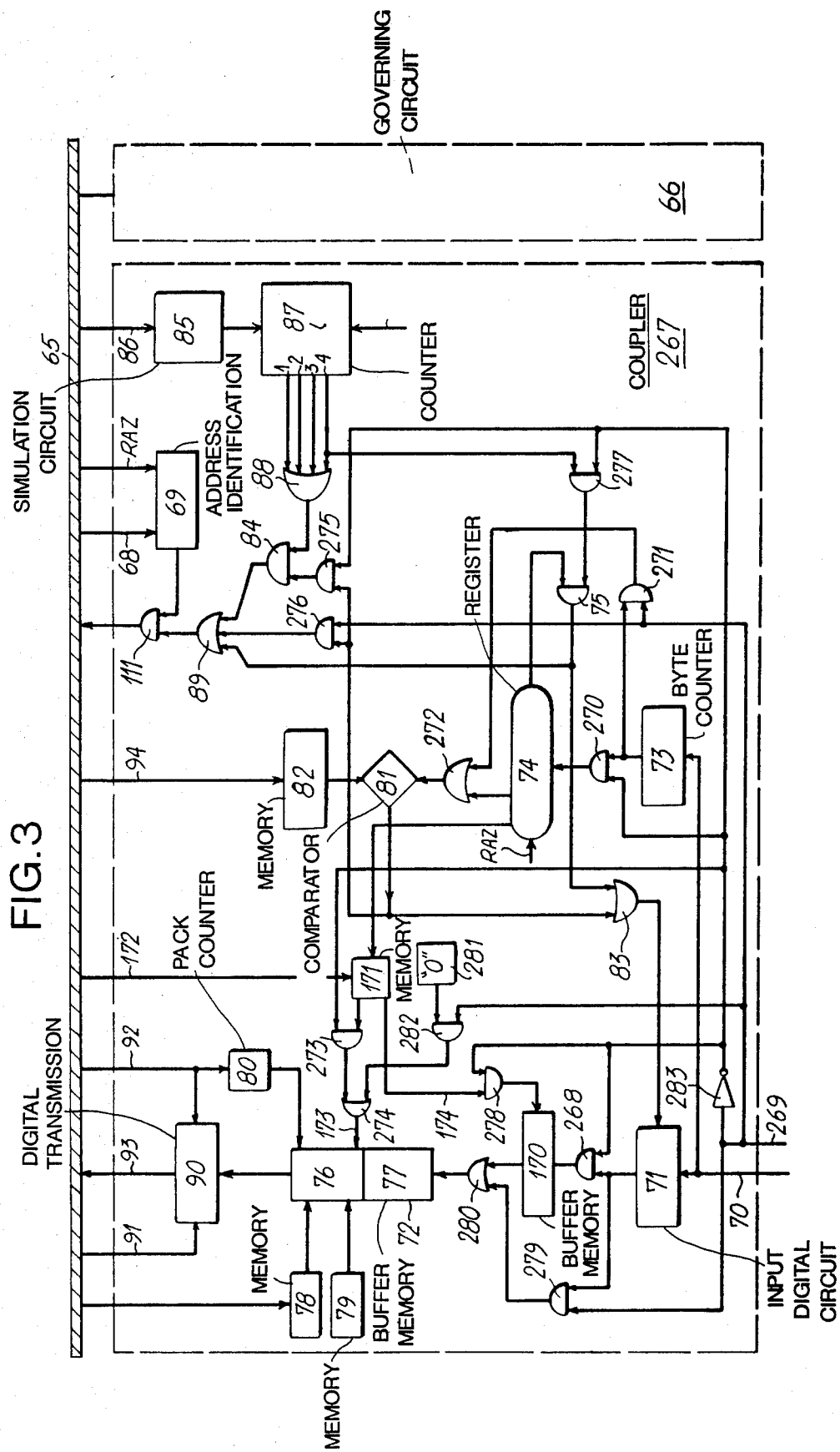
FIG. 3 is a block-diagram of the digital part of the transmission equipement.

FIG. 3 shows a bus line 65, a governing circuit 66 and a coupler 267, able to connect any source 247–253 to the bus 65. It must be noted that there is as many couplers as there are sources. In practice, bus 65, circuit 66 and couplers 267 constitute the manager 46, FIG. 1. The governing circuit 66 is connected to 65 and it may control couplers 267 and be connected to data bus 65. Circuit 66 will not be described in detail because it is identical to circuit 76 in FIG. 3 of the U.S. Pat. No. 4,058,830. There will only be recalled that circuit 66 delivers, under the form of addresses, questions to the couplers in order to collect the identities of the couplers ready to transmit, then it sequentially delivers transmission orders toward those couplers.

In couplers 267, the questions coming from governing circuit 66 enter through connection 68 which is connected to an address identification circuit 69 comprising components 90, 92 and 126 in FIG. 3 of U.S. Pat. No. 4,058,830. Output of circuit 69 is connected to the first input of an AND gate 111, the output of which is connected to bus 65.

Data from the source or channel associated with coupler 267 are transmitted through a link 70 of the same type as described in the French Pat. No. 2 268 308. Through link 70, data enter into input digital circuit 71 under the form of parallel bytes. The output of circuit 71 is connected to, on the one hand, a first input of an AND gate 268 and, on the other hand, a first input of an AND gate 279. The output of AND gate 268 is connected to the input of a intermediary buffer memory 170 whose output is connected to a first input of an OR gate 280 whose output is connected to the input of a buffer memory 72. The output of AND gate 279 is connected to the other input of OR gate 280. In parallel with link 70, the channel is connected to coupler 267 by a wire 269 whereon level "1" indicates that the channel transmits data belonging to the level "4" as defined in the above mentioned standard ISO and level "0" indicates that it transmits conventional data, such as teletext data.

Furthermore, the "forward" wire of link 70, that transmits a condition change signal for each byte transmitted through conductor 70, is connected to the input of a byte counter 73 whose output is connected to, on the one hand, a first input of an AND gate 270 whose output is connected to a register 74 that stores the number of bytes transmitted from digital input circuit 71 to intermediary buffer memory 170. On the other hand, output of byte counter 73 is connected to the first input of an AND gate 271 whose output is connected to a first input of an OR gate 272. Reset input of register 74 is connected from bus 65. One output of register 74 is connected to the second input of OR gate 272 and the other output of register 74 is connected to the input of a memory 171. Memory 171 has a control input connected from bus 65 through wire 172 and an output connected to a third input of AND gate 273 whose output is connected to a first input of an OR gate 274 whose output is connected to the data memory 72 through the wire 173.

The data memory 72 is comprised of two parts, one part 76 wherein the pack prefix bytes are stored and the other part 77 wherein the data bytes from the source, through 71 and 170, are stored. Part 76 has a first input connected from a memory 78 storing sync bytes 1 and 2 and start byte 3, a second input connected from memory 79 storing the three channel identification bytes 4–6, a third input connected from a pack counter 80 providing the index of the pack, i.e. the continuity byte, and a fourth input connected from output of OR gate 274 which provides, at the time of the transmission, either the number of the bytes stored in the part 77 that is known through counter 171, or the value "nil" stored in a memory 281 whose output is connected to a first input of an AND gate 282 whose output is connected to the second input of OR gate 274, i.e. the format byte whatever origin it is from.

An output of register 74 also is connected to the second input of OR gate 272 whose output is connected to the first input of a comparator means 81 whose second input is connected from output of a memory 82 storing the number Mmax=Nmax−8, that corresponds to the maximum number of data bytes which can be transmitted within one pack. The output of comparator 81 is connected to the second input of OR gate 83, the first input of an AND gate 275 whose output is connected to the first input of an AND gate 84, and the first input of an AND gate 276 whose output is connected to the third input of OR gate 89. The output of OR gate 83 is connected to the inhibition control input of circuit 71.

The coupler further comprises a simulation circuit 85, which receives a rate indication from governor 66, through bus 65 and a connection 86. That rate indication depends on the operation rate of the reception equipments capable of receiving the data from the source associated with the coupler. With that rate information, simulator 85 simulates emptyings of buffer memory 72, which are counted in a counter 87. Data outputs "1"–"4" of counter 87 are connected to the inputs of an OR gate 88 whose output is connected the second input of AND gate 84. In addition, output "4" of 87 is connected to the second input of an AND gate 277 whose output is connected to the second input of AND gate 75. The outputs of AND gates 75 and 84 are respectively connected to the first two inputs of an OR gate 89 whose output is connected to the second input of AND gate 111. The output of AND gate 75 further is connected to an input of the OR gate 83.

The output of memory 72 is connected to a digital transmission circuit 90 which receives from bus 65, through connection 91, the bit frequency signal and, through connection 92, the transmission order from governing circuit 66. The output of circuit 90 is connected to line 65 through wire 93 which serially transmits, bit by bit, the data pack toward the modulation part of the transmission equipment. Connection 92 also is connected to the input of counter 80 which thus can count the packs transmitted by the coupler 267.

As mentioned above, circuit 171 has a first output connected, through AND gate 273, OR gate 274 and wire 173, to part 76 of 72. The second output of circuit 171 is connected to the first input of an AND gate 278 whose output is connected, through a wire 174, to the read control input of buffer memory 170. Memory 170 is read out into part 77 of memory 72 for each read-out control signal from memory 171.

In coupler 267, the wire 269, in parallel with link 70, is connected to, on the one hand, the second inputs of AND gates 271, 276, 279, and, on the other hand, the input of an inverter 283 whose output is connected to the second inputs of AND gates 268, 270, 273, 275, 277 and 278.

Figure 4:
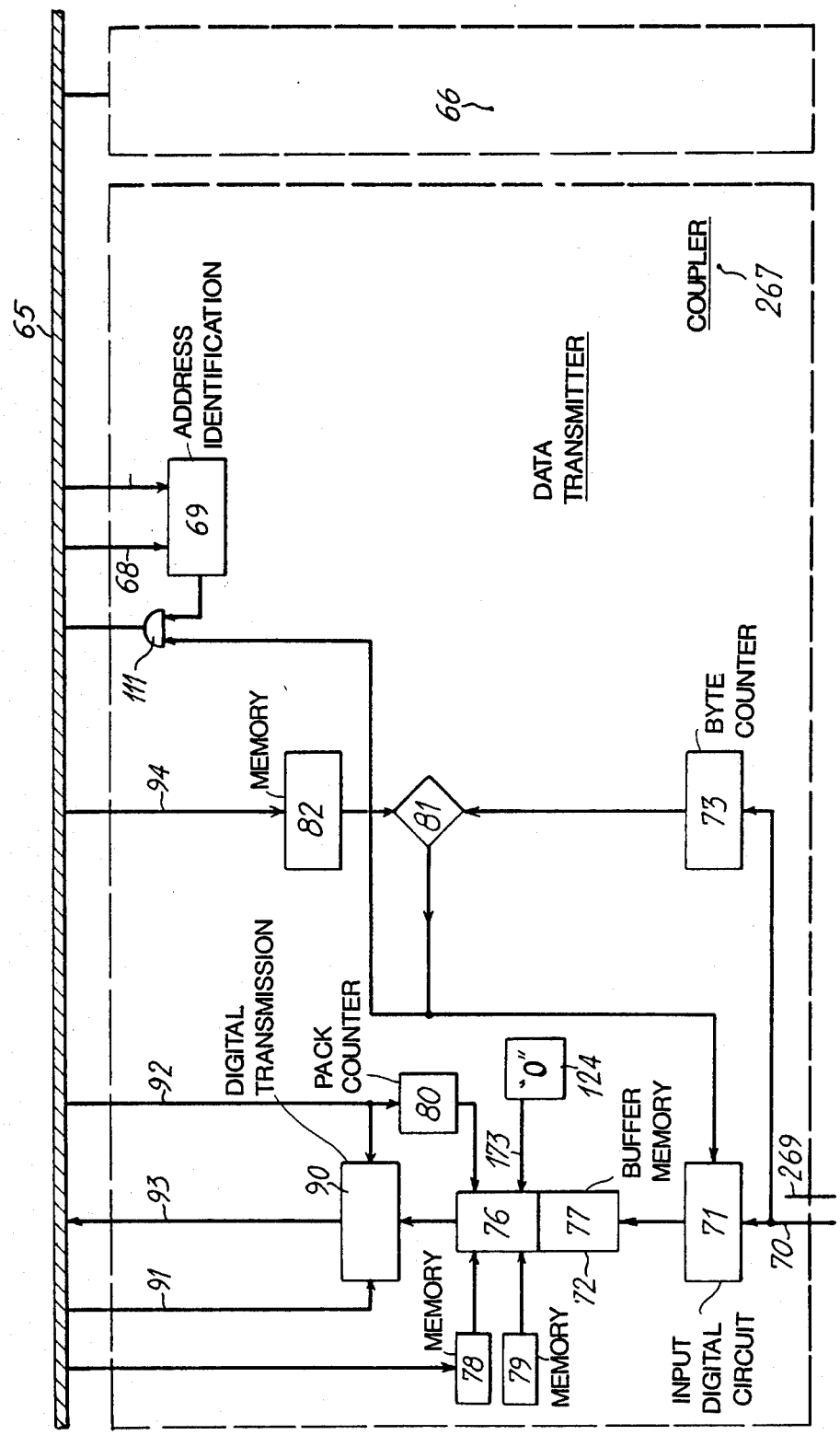
FIG. 4 is a diagram making it possible to illustrate the mode of operation of the digital part shown in FIG. 3 in case of data transmission of the level "4"

When wire 269 is at level "0", the operation of coupler 267 is identical to that described in the U.S. patent application Ser. No. 189,080 (now U.S. Pat. No. 4,420,833), because AND gates 268, 270, 273, 275, 277 and 278 are switched on by the output signal from inverter 283 that is at level "1". When wire 269 is at level "1", the operation is a little bit changed. Indeed, simulation circuit 85 and its associated counter circuit 87 and AND gate 88 no longer intervenes in the operation and the same is true for register 74, counter 171 and intermediary buffer memory. Assuming that AND gates 271, 276, 279 and OR gates 83, 89, 272, 274 and 280 are not taken into account since they serve only as gates, the circuits which actually intervene in the processing operation of the coupler are those which are shown in FIG. 4.

It is known that memory 72 is read out toward data bus 65 when the pack transmission is authorized and when the following condition occurs, that is the number of bytes written in buffer memory 77 is the same as the value stored in memory 82. As soon as comparator means 81 has detected a coincidence on its two inputs, digital input circuit 71 stops transmission through link 70 because its inhibition control input is on. It clearly appears that in each data pack the contents of the format byte is nill.

To be noted that the operator of the source associated with the concerned coupler always transmits only information data, without being concerned by the number Mmax or the bit transmission rate.

Figure 5:
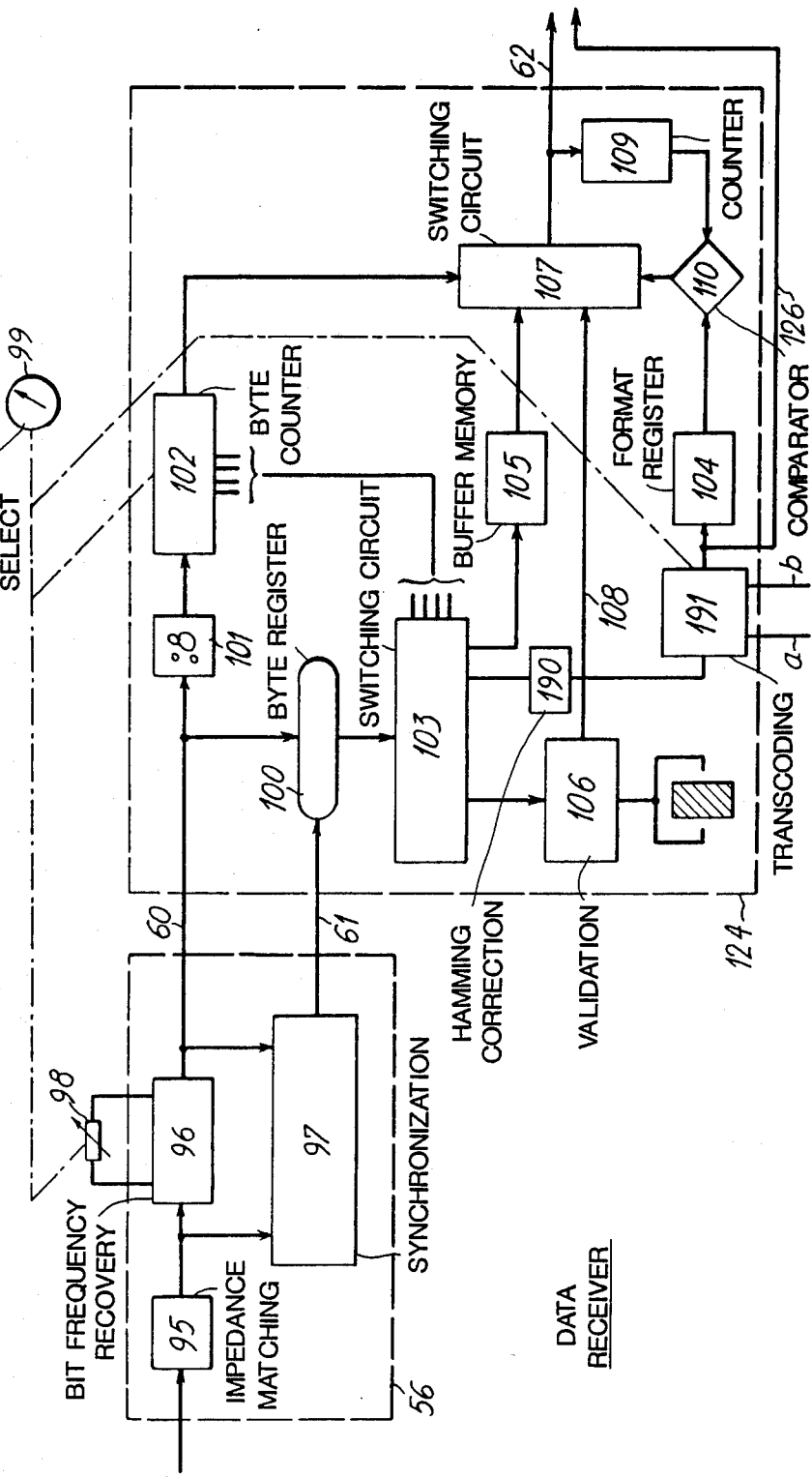
FIG. 5 is a block-diagram of a data receiving equipment.

The demodulation part of a subscriber reception equipment is shown in FIG. 5. The video signals from the television receiver 44 are applied to an impedance matching circuit 95, the output signal of which is applied, on the one hand, to a bit frequency recovery circuit 96 for the recovery of the bit frequency and, on the other hand, to a synchronization circuit 97. Synchronization circuit 97 comprises the circuits bearing the same numerical references as in FIG. 5 of the U.S. Pat. No. 4,058,830, and it recognizes, especially, the start byte so that it will transmit to the digital part 57, through connection 61, only the fourth byte of each pack and the following one. Circuit 96 comprises, as do the conventional circuits for the recovery of bit frequency, a tuned circuit comprising a variable impedance component 98, which may be a variable capacitance diode, the impedance of which is controlled by the television channel selector 99. Circuit 96 delivers the bit frequency signal, on the one hand, to synchronization circuit 97 and, on the other hand, to circuit 57 through connection 60.

In circuit 57, the signal at the bit frequency is applied, on the one hand, to a byte register 100 and, on the other hand, to a divider by eight 101, the output of which is connected to the input of a byte counter 102. The bits of the packs are serially applied by 61 to the data input of byte register 100 which transmits the bytes in parallel to a switching circuit 103. Byte counter 102 has its first six outputs which correspond to the first six bytes received in 57, that is to say to bytes 4–9, connected to control inputs of switching circuit 103, such control inputs being thus serially enabled which results in serially delivering the pack bytes to the validation circuit 106, as far as bytes 4, 5 and 7 are concerned, to a Hamming correction circuit 190 for byte 8, and to a data buffer memory 105 for the following bytes. The output of Hamming correction circuit 190 is connected to the input of a transcoding circuit 191, the output of which is connected to format a register 104.

Figure 6:
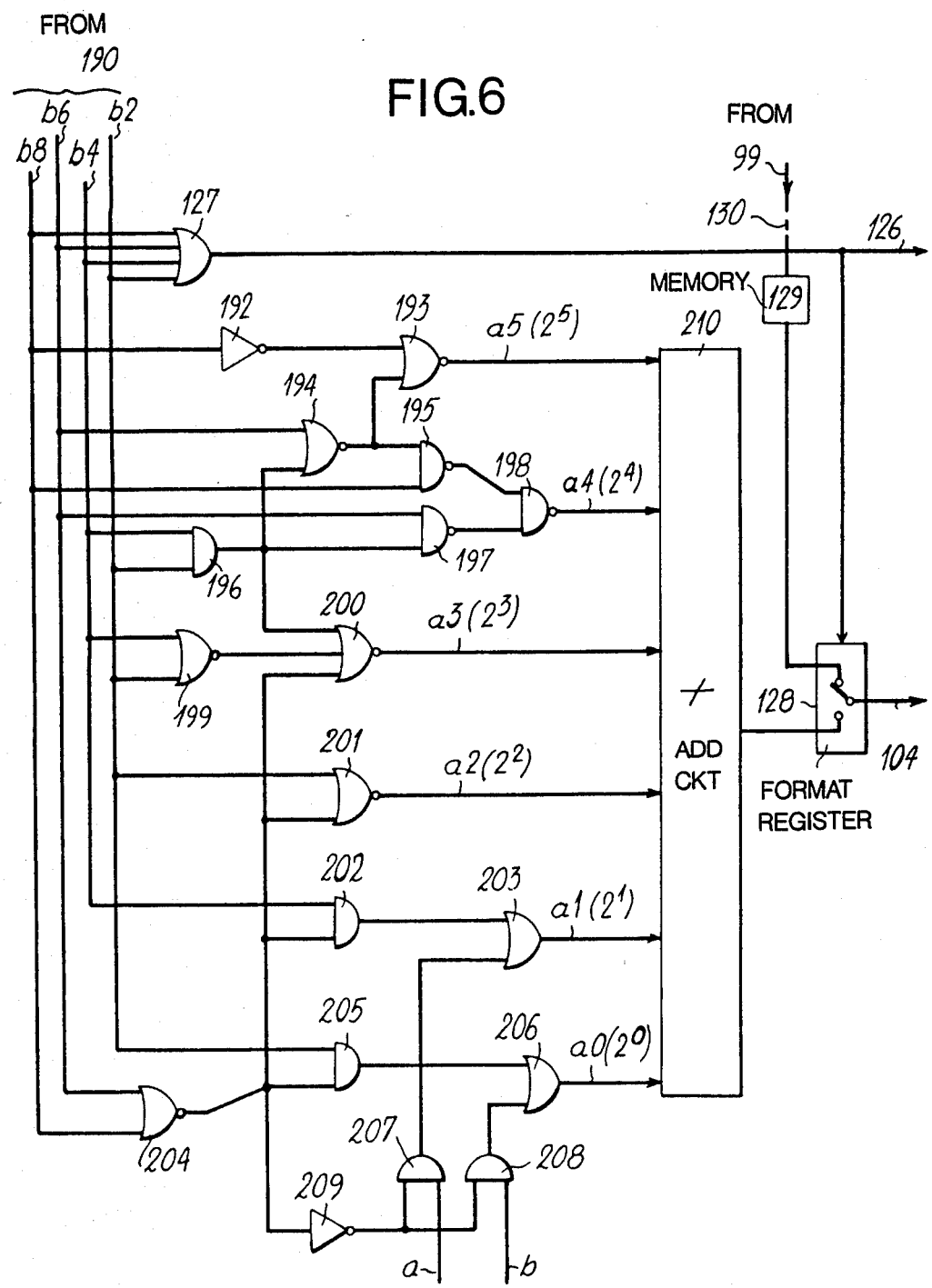
FIG. 6 is a diagram of the transcoding circuit of the receiving equipment shown in FIG. 5.

Validation circuit 106 may include circuits 168, 179, 166, 171, 167, as shown in FIG. 6 of U.S. Pat. No. 4,058,830 and, possibly, circuits 173 and 174 shown in the same FIG. 6.

The output of buffer memory 105 is connected to the input of a switching circuit 107 which may be activated by a connection 108 from validation circuit 106. The output of switching circuit 107 is connected to a link 62, of the same type as link 70 shown in FIG. 3, which is connected to the final utilization equipment 63. One wire of link 62 is connected to the input of a counter 109 which counts the bytes transmitted by switching circuit 107. The output of counter 109 is connected to one input of a comparator circuit 110 whose the second input is connected from the output of format register 104 and output is connected to the inhibiting input of circuit 107. Finally, the output of byte counter 102 is connected to a enable input of circuit 107.

Counter 102 activates its output when it reaches the Nmax count. At that time, buffer memory 105 has received Nmax bytes of which possibly only P pack bytes are valid, P representing the total length of the pack. Assuming that circuit 106 validates the pack, as soon as counter 102 validates its output, the bytes may be transferred from memory 105 to data bus 62 through switching circuit 107. As soon as P bytes have been transferred, the inputs of comparator circuit 110 have the same values, and the output of comparator 110 forbids any other transmission from memory 105 to bus 62, for the television line under consideration which serves as the transmission channel or support for the pack.

In the circuit shown in FIG. 5, the Hamming correction circuit is a conventional circuit which will not be described, while transcoding circuit 191 makes it possible, from bits b2, b4, b6 and b8 of the format byte, to find the real length of the block, which is transmitted to register 104. By way of example, transcoding circuit 191 may be designed in the form shown in FIG. 6.

As shown in FIG. 5, output of television channel selector 99 is also connected to a control input of the transcoding circuit 191 which comprises not only an output toward register 104, but also a second output 126 which follows a path parallel to link 62.

In the circuit shown in FIG. 6, the input wires b2, b4, b6 and b8 transmit the four bits delivered from the Hamming correction circuit 190 toward the most significant weight. The input wire 68 is connected, on the one hand, to the input of an inverter 192 the output of which is connected to an input of a NOR gate 193 the output of which delivers a signal of value $2^5$ or 0 through wire $a^5$ and, on the other hand, to an input of a NAND gate 195 the output of which is connected to an input of a NAND gate 198 the output of which delivers a signal of a value $2^4$ or 0 through wire $a^4$. Input wire b6 is connected, on the one hand, to an input of a NOR gate 194 the output of which is connected to one the second input of the NAND gate 195 and to the second input of the NOR gate 193 and, on the other hand, to an input of an NAND gate 197 the output of which is connected to the second input of NAND gate 198.

The input wire b4 is connected, on the one hand, to an input of an AND gate 196 the output of which is connected to the second input of the NOR gate 194, to the second input of the NAND gate 197 and to the first input of a three input NOR gate 200, and, on the other hand, to the first input of a NOR gate 199 the output of which is connected to the second input of the NOR gate 200 the output of which delivers a signal of value $a^3$ or 0 through wire a3. Input wire b2 is connected, on the one hand, to the second input of the NAND gate 199 and, finally, to the first input of a NOR gate 201 which delivers a signal of value $a^2$ or 0 through wire a2. Input wire b4 is also connected to an input of an AND gate 202 the output of which is connected to an input of an OR gate 203 which delivers a signal of a value $2^b$ or 0 through the wire a1. Input wire b2 also is connected to an input of an OR gate 206 which delivers a signal of a value $2^0$ or 0 through wire a0. Wire b6 also is connected to an input of an NOR gate 204 the output of which is connected, in parallel, to the third input of the NOR gate 200, to the second input of the NOR gate 201, to the second input of the AND gate 202, to the second input of the AND gate 205 and to the input of an inverter 209. The output of inverter 209 is connected to the first inputs of two AND gates 207 and 208. The output of gate 207 is connected to the second input of the OR gate 203 and the output of the gate 208 is connected to the second input of OR gate 206. The second inputs of AND gates 207 and 208 are respectively connected to two control wires A and B.

The values of the outputs a5 to a0 are added in the adder circuit 210 before being applied to format register circuit 104.

Input wires b2, b4, b6 and b8 also are connected to the four inputs of an OR gate 127 whose output is connected to the control input of an electronic switch 128 whose a first signal input is connected from the output of adder circuit 210 and output is connected to register 104. The second signal input of electronic switch 128 is connected from the output of a memory 129 wherein a predetermined number is stored which preferably is the number Nmax. The wire 130 between channel selector 99 and memory 129 enables a variation of the number Nmax in accordance with the selected television channel. The output of OR gate 127 also is connected to wire 126.

When a format byte value is not nil, the output of OR gate 127 is at level "1" which switches output of adder circuit 210 toward format register 104 and the operation is the same as described in the U.S. patent application Ser. No. 189,080 (now U.S. Pat. No. 4,420,833). When the format byte value is nil, the output of gate 127 is at level "0", which switches the output of memory 129 toward register 104 that thus stores the number Nmax. Furthermore, through wire 126, output of OR gate 127, connected in parallel with link 62, indicates that the data pack is not a conventional data pack, such as for instance a teletext pack.

What is claimed is:

1. A one-way data transmission system wherein a transmitting station transmits packs of digital data, from at least one of several channels, each data pack including a prefix containing synchronism signals and channel identification code signal, a data pack format signal indicating the length of the data sequence following the prefix when the transmitted data are teletext data, the transmitted data have a structure such that they provide possible error corrections and ciphering, the length of the transmitted packs always being a maximum and the format of the byte value being nil, the transmitting station comprising a coupler means associated with each of said channels, each of said coupler means having an input circuit means with an input coupled to receive signals of a channel associated therewith, data memory means coupled to an output of said input circuit means, multiplexing circuit means coupled to an output of said data memory means, control circuit means, common to all of said coupler means, counter means fed at a predetermined rate, means responsive to a full memory for delivering an inhibition control signal to said input circuit means, means for connecting said data memory means to said multiplexing circuit and then reading out and resetting said counter and thereafter suppressing said inhibition control signal, register means having a settable maximum capacity coupled to said means for delivery said inhibition control signal to deliver said inhibition control signal when the count of said data reaches a predetermined value, small capacity buffer memory means coupled between said data memory means and said input circuit means controlled by a programmed control circuit means for controlling the read out of data from said buffer memory, a wire coupled between each channel equipment and the coupler means associated therewith, said wire being switchable a level "1", or "0", each coupler means further including first switching means for switching off said counter means and buffer memory means, and format byte memory means storing the value "nil", and second switching means for connecting said format byte memory means to said data memory means for each data pack transmission when said wire is at level "1" or "0", said first and second switching means being at rest when said wire is at level "0" or "1".

2. A one-way data transmission system according to claim 1, and reception equipment means for receiving signals from the said data one-way transmission system, means responsive to an acceptance of said data sequence following said prefix for storing said accepted data sequence in a buffer memory means, output circuit means responsive to said buffer memory, pack format signal register means for storing a format signal of each received data pack prefix, counter means fed by a byte clock signal for controlling a read out of a data sequence from said buffer memory means into said output circuit means, as soon as said counter means has reached a predetermined maximum count, the length of said data sequence being limited by the contents of said format signal register means, transcoding circuit means for processing the transmitted format signal and including means for recognizing the value "nil" of a format byte, means for converting that value into the value "Nmax" that is transmitted to the format signal register means, and an output wire connected to said output circuit.

* * * * *